May 17, 1966  D. M. MURPHY  3,251,582
GRAIN CIRCULATING APPARATUS
Filed June 18, 1964  4 Sheets-Sheet 1
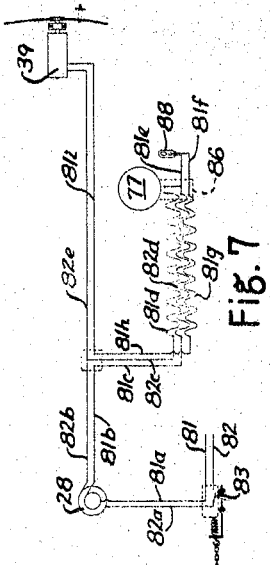
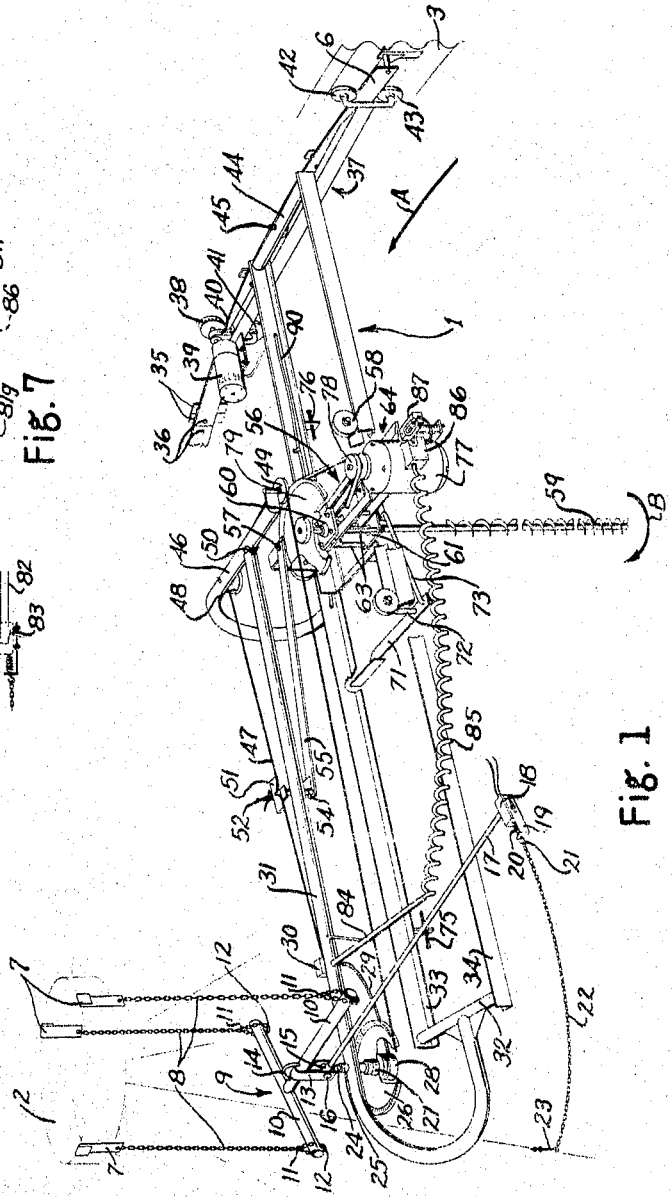
Inventor
DAVID M. MURPHY
By Lane, Aitken, Dunner & Ziems
Attorneys

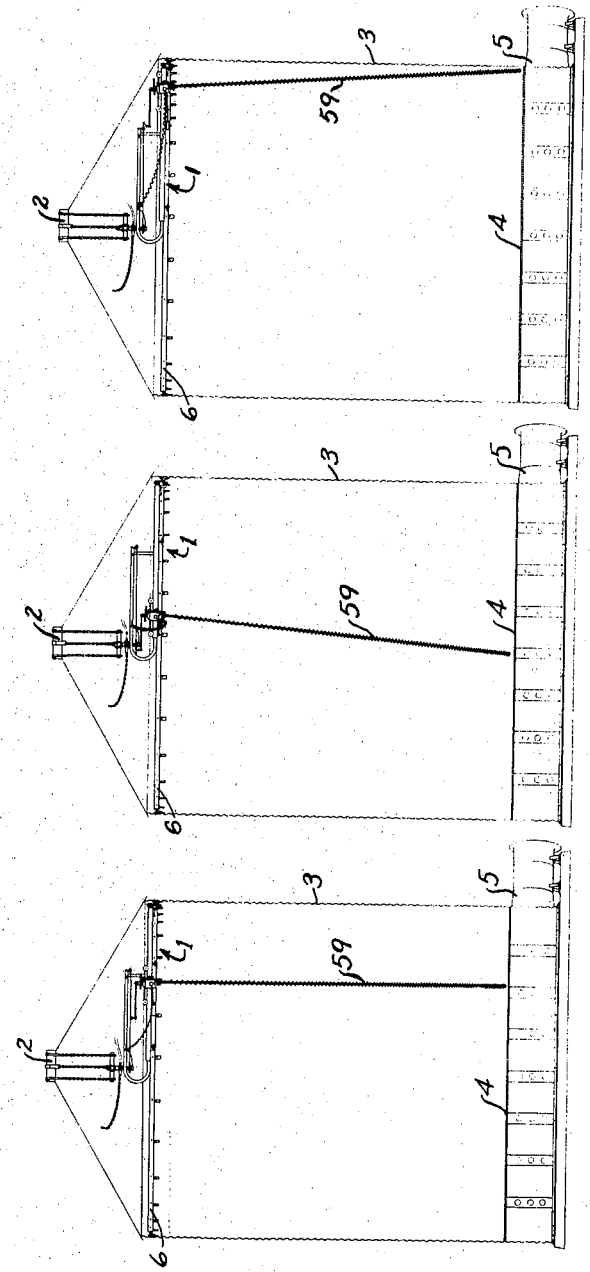

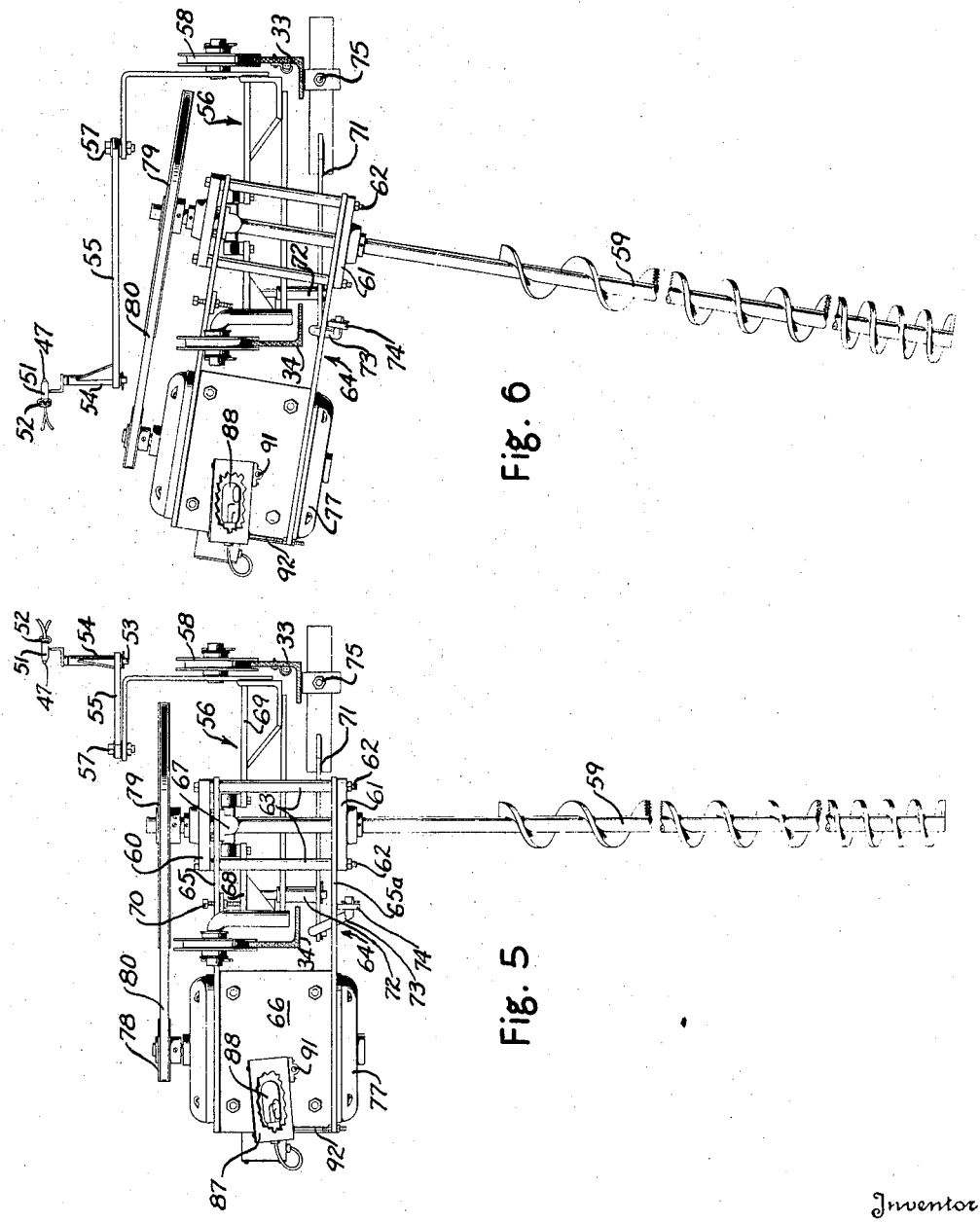

May 17, 1966 D. M. MURPHY 3,251,582
GRAIN CIRCULATING APPARATUS
Filed June 18, 1964 4 Sheets-Sheet 4

Inventor
DAVID M. MURPHY

By Lane, Aitken, Dunner & Ziems
Attorneys

United States Patent Office 3,251,582
Patented May 17, 1966

3,251,582
GRAIN CIRCULATING APPARATUS
David M. Murphy, 601 1st St. NW., Mason City, Iowa
Filed June 18, 1964, Ser. No. 376,024
8 Claims. (Cl. 259—111)

This invention relates to apparatus for stirring and mixing agricultural grain during the process of drying the grain for storage and more particularly, it concerns improvements and refinements in such apparatus by which periodic aeration of the entire contents of a grain storage bin may be effected to prevent spoilage and damage due to insect infestations.

A standard method of drying grain preparatory to storage is to place the grain in a metal bin, frequently of cylindrical form, and blow heated air upwardly through the mass of grain for a period of time until the grain has been sufficiently dried by absorption of moisture from the grain by the heated air. This is accomplished by the provision of a perforated false floor in the bin and the connection of the outlet of a fan and heating unit to the space beneath the perforated false floor. As the heated air rises through the mass of grain, it cools and acquires moisture from the grain. The result is that as the air reaches the upper levels of the grain mass, the relative humidity of the air rises markedly, thereby decreasing the ability of the air to exert a drying effect on the grain in these upper levels, particularly the grain at the top. In some instances, there may be some condensation of moisture on the uppermost layers of grain. Attempting to dry a sizeable mass of grain in this manner means that the drying period must be quite protracted, and that by the time the upper layers of grain are dried sufficiently to prevent spoilage, the bottom layers of grain are likely to be overdried. Costs for heat and power, as well as the time consumed in drying one binfull, are excessive.

Another difficulty with the foregoing procedure is that in filling a grain drying bin, the filling invariably being accomplished by use of some form of elevator or conveyor which drops the grain into the grain drying bin through an opening in the top of the bin, the chaff and fines (broken kernels of the grain) tend to collect in certain areas, particularly at the center of the bin. These areas will then be of higher density than the remainder of the grain mass and the drying air will pass through such denser areas less readily, so that such areas tend to remain moist, and spoilage may start in such areas before the drying operation can be completed.

The difficulties mentioned indicate a need for some means of physical movement and/or mixing of the grain during the drying process. A wide diversity of techniques have been tried in prior attempts to fill such a need but none have been fully effective and satisfactory from the standpoint of cost and reliability as well as avoidance of damage to the grain, such as grinding of the kernels during the mixing process.

Essentially, the apparatus of this invention includes an open auger (i.e., an auger not enclosed in a tube of any kind) which is suspended in a substantially vertical position from a support adapted to be installed in the top of a grain drying bin, the lower extremity of the auger being in close proximity to, but not touching, the perforated false floor of the bin. As this auger is rotated, it propels grain from the bottom levels of the grain mass upwardly and deposits grain from the lower levels of the grain mass in a mound around the auger shaft over the top grain. Withdrawal of grain from the lower levels of the grain mass causes grain in an upwardly-diverging column above the point of withdrawal, i.e., the area surrounding the lower portion of the auger, to gravitate downwardly. This effects a circulation of grain from bottom to top and from top to bottom, with considerable intermediate mixing of grain from and at all levels. Such circulation and mixing are both conducive to improved drying, in terms of speed as well as uniformity.

Agricultural grains of high moisture content exhibit markedly greater intergranular static friction than the same grains when dry enough to be stored. High-moisture grain is also softer than dry grain, and when subjected to the pressures to be encountered at the bottom levels of a full bin, tends to pack. This packing, and the aforementioned high degree of static friction between kernels, create a number of distinct problems which must be overcome in any practicable circulation and/or mixing device.

First, any type of movement-producing element will encounter high initial resistance from high-moisture grain immediately in contact with the movement-producing element when it is attempted to start operation thereof, such as the first few revolutions of the auger previously mentioned. Once movement of grain immediately surrounding the auger or other movement-producing elements is established, the static friction will have been overcome and the packing relieved in that particular area. Continued operation will then require only a fraction of the force or torque needed to initiate the operation. The resistance to initial operation is directly proportional to the volume of grain which must be moved to allow such operation and the relative rapidity with which said grain is moved. This indicates the requirement for an auger with as small initial displacement as practicable and consistent with eventual success of the mixing and circulation operation, in terms of rapidity and uniformity of drying. It should also be pointed out that use of larger augers with the application of proportionately greater starting torque would necessitate use of proportionately more massive and costly supporting means to prevent the downward thrust of the auger from pulling the auger downwardly to a point where the supporting means and/or the perforated floor would be damaged. Such constructions could easily involve costs inconsistent with farm installation.

A second problem arising from intergranular static friction and packing of high-moisture grain is that the high-moisture grain will not flow readily in any direction except downwardly, of its own weight, upon removal of underlying material. It is therefore necessary to move the circulation- and mixture-producing element or auger laterally inside the grain drying bin so that the auger will eventually reach and circulate the entire contents of the bin. Because of the proclivity of high-moisture grain to move downwardly of its own weight, circulation and mixing of the entire contents of a grain drying bin may be accomplished by an operational cycle which ensures that the lower extremity of the auger will reach and move the entire lower level of the grain mass as uniformly and consistently as possible. The upper levels of the grain will then gravitate downward and be subject to mixing and circulation, even though the upper portion of the auger does not necessarily travel into all areas of said upper levels of the grain mass. For reasons to be discussed below, it is desirable and practicable to accomplish the foregoing by operating the auger at a slight inclination from vertical in certain areas of the grain drying bin, omitting coverage by the auger of the top levels of the grain mass in these areas.

When lateral movement of the auger within the grain mass is attempted, another problem arising from the previously-discussed static friction and packing of high-moisture grain at the lower levels of a filled grain drying bin arises, this problem being that the compacted un-augered grain mass surrounding the relatively small volume of grain kept in movement by the auger offers substantial resistance to the lateral movement of the auger into said compacted grain mass. Distance from the bottom levels of the grain to the auger shaft bearings as well as the need to keep auger size to a minimum for considerations of initiating rotation precludes use of auger shafts of sufficient size and strength to render forcible lateral movement feasible, particularly where the force is applied from above, through the auger shaft. Resistance of the high-moisture grain also renders any form of pull-rod or thrusting strut impracticable, as these elements would themselves be difficult if not impossible to force through the compacted grain mass.

A principal object of this invention is, therefore, the provision of an improved grain circulating apparatus by which the problems heretofore experienced are substantially and effectively overcome.

Another object of this invention is that of providing a grain circulating apparatus of the type referred to by which substantially the entire mass of grain within a grain storage bin may be circulated and mixed during drying without requiring an inordinately large power source for effective and rapid operation.

A further object of this invention is the provision of a grain circulating apparatus of the type employing an auger supported for movement in a spiral path with improved means for moving the auger in the spiral path.

Another object of this invention is the provision of an improved auger supporting and driving means for a grain circulating apparatus of the type referred to by which the supporting structure and power required to operate the apparatus is kept to a minimum.

A still further object of this invention is the provision of a grain circulating apparatus of the type referred to with an improved auger by which the power required to rotate the auger is minimized and by which improved grain circulation results.

Other objects and further scope of applicability of the present invention will be apparent from the detailed description to follow taken in conjunction with the accompanying drawings in which:

FIG. 1 is a perspective view of the circulation and mixing apparatus of this invention with portions of the grain drying bin shown in part to indicate relationship and attachment structure;

FIGS. 2 through 4 are sectional views of a conventional grain drying bin in elevation, showing the circulation and mixing apparatus of this invention therein at three stages of the operational cycle;

FIGS. 5 and 6 are sectional views of the circulation and mixing machine looking toward the center of the grain drying bin, these two views illustrating an important feature of the operation of the circulation and mixing machine;

FIG. 7 is a schematic diagram of the electrical circuits of the circulation and mixing apparatus of this invention incorporating a detail of a safety-overload shut-off device.

Figure 8:
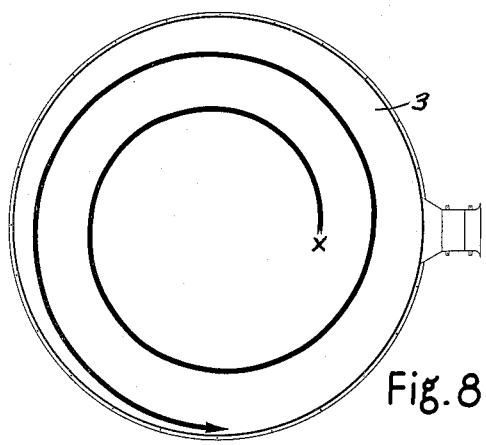
FIGS. 8 through 12 are overhead sectional views of a grain drying bin showing the pattern of travel of the lower portion of the auger of the circulation and mixing machine, in progressive stages.

As shown in FIGS. 1–6 of the drawings, the grain circulation and mixing machine of this invention includes a bridge generally designated by the reference numeral 1. The inner end of the bridge 1 is adapted to be suspended from the central roof hatch collar 2 of a conventional circular grain bin 3 having a perforated floor 4 and equipped with a plenum 5 so that heated drying air may be fed to the space below the floor 4. The outboard end of the bridge 1 travels on a track 6 adapted to be installed on the inside of the outer wall of the grain drying bin, near the top of the wall. To support in the inboard end of the bridge 1, three suspension hooks 7 engage the edge of the central roof hatch collar 2 as shown, and suspension chains 8 are attached to suspension hooks 7. The chains 8, in turn support a suspension T 9 at the desired level by passing the ends of suspension chains 8 under the extremities of the arms 10 of suspension T 9 and tying the suspension chains 8 back, each upon itself, with hooks 11. It will be seen that this arrangement provides an economical method of adapting the suspension assembly to any size central roof hatch and also provides a simple means for adjusting the height of the suspension T 9 to effect the levelling of the bridge 1. Guide loops 12 prevent the suspension chains 8 from coming off the ends of the arms of the suspension T 9 or from working toward the center of the suspension T.

At a central point substantially equidistant from the three ends of suspension T 9, a suspension strap 13 is placed over one arm of the suspension T 9 in the attitude of an inverted U and is restrained from sliding out of position by a loop 14 which also serves as a lifting eye to receive the lifting hook of a hoist or rope tackle (not shown) employed in raising the inboard end of the circulation and mixing machine into position at the time of installation in the grain drying bin. Between the downwardly-extending arms of the suspension strap 13 is placed a fitting known in the plumbing trade as a side-entrance T 15. This type of pipe fitting has two internally-threaded openings oppositely and co-axially positioned and two additional internally-threaded openings on axes at right angles to each other and also at right angles to the first two oppositely and co-axially positioned openings. The two oppositely and co-axially positioned openings in side-entrance T 15 are placed in alignment with holes in the downwardly-extending arms of suspension strap 13 and a pair of flange-type plugs 16 are inserted through the holes and threaded tightly into the oppositely and co-axially positioned openings in the side-entrance T 15. It will be noted that the pivotal axis of suspension strap 13 upon the suspension T 9 and the pivotal axis of side-entrance T 15 between the downwardly-extending arms of suspension strap 13 are substantially at right angles, as viewed from above or below, forming a simple universal joint, a necessary component of suspensions of this nature, to avoid stress on other elements of the suspension system resulting from adjustments, misalignments, irregularities of shape of grain drying bin structures, etc.

A third internally-threaded opening in side-entrance T 15 receives a length of pipe 17, which extends, as shown in FIG. 1 in a horizontal direction and has attached to its outer end a switch box 18, to which are attached a sliding shut-off plate 19 and an extension spring 20. A chain hook 21 and a restraining chain 22 are attached to the sliding shut-off plate 19. The other end of the restraining chain 22 is secured to the bin roof by means of a hook bolt 23.

The fourth opening of side-entrance T 15 is directed downwardly and receives a suspension pipe 24, which passes through a tubular bearing 25 and is securely fastened at its lower end to the hub of a cable drive sheave 26. A thrust bearing 27 is interposed between the lower end of the tubular bearing 25 and the top surface of the hub of the cable drive sheave 26.

Attached beneath the cable drive sheave 26, and substantially coaxial therewith, is rotary slip-ring contactor unit 28, the rotational division plane of rotary slip-ring contactor unit 28 being a horizontal plane normal to the axis and bisecting the rotary slip-ring contactor unit 28, so that the top and bottom halves of said rotary slip-ring contactor unit will rotate freely about a common axis with respect to each other. The electrical circuit between the halves of the unit 28 is maintained at all times by the slip-ring construction therein in accordance with conventional practice. The top half of rotary slip-ring contactor unit 28 is securely attached to the underside of the cable drive sheave 26 as previously noted, and the lower half of the rotary slip-ring contactor unit 28 has connected thereto a flexible electrical conduit 29 which extends to a junction box 30, which is mounted on a gooseneck pipe 31 forming a part of the bridge 1. It will be seen that tubular bearing 25 passes through and is welded to the pipe 31. The gooseneck or inboard portion of the pipe 31 extends downwardly, and is welded to a crosspipe 32. The crosspipe 32 is connected to the inboard ends of rails 33 and 34 which form the primary structural members of the bridge 1.

At the outboard end of the bridge 1, support is derived from the circular track 6 which is attached to the wall of the grain drying bin by brackets 35 and bolts 36, as shown. A bridge supporting carriage 37 runs on the track 6, the direction of travel being shown by arrow A in FIG. 1. The forward end of the carriage 37 is supported by toothed drive roller 38 adapted to propel the carriage 37 along the track 6 by virute of its connection to a bridge drive motor 39 through a bearing 40. The toothed construction of the drive roller has been found advantageous in conditions where frost builds up on the track 6 and also to facilitate uninterrupted travel over accidentally misaligned track joints. The track 6 is not necessarily notched or toothed to match the toothed drive roller. The toothed drive roller 32 is in practice hardened, and soon wears small notches in the track, giving quite positive traction under all conditions. A guide roller 41 engaging the lower edge of the circular track 6, serves to prevent accidental disengagement or derailment of the toothed drive roller 38 from the track 6. The trailing or rear end of the carriage 37 is supported on the track 6 by a roller 42. A guide roller 43 performs the same function here as guide roller 41 at the forward end of carriage 37. The outboard ends of bridge rails 33 and 34 are securely welded to a crosspipe 44, and take a bearing on the flat top surface of the carriage 37. A pivotal connection between the carriage 37 and the bridge structure is made at this point. To this end a spring-loaded bolt 45 extends through the crosspipe 44 and the top surface of the carriage 37. The pivotal connection serves to prevent creation or transmission of stress at this point from possible irregularities in track 6 or other geometrical imperfections, permanent or temporary, in the combined stuctures of grain drying bin and circulation and mixing machine. It should be noted at this point that grain drying bins, being commercially-fabricated sheet metal structures, are often somewhat out-of-round, not perfectly level, openings not placed with geometrical accuracy, etc., so that any device to be used in conjunction with such structures must be equipped to compensate for such irregularities and imperfections without impeding operation of the device.

The structure of the bridge 1 is completed by the attachment of a pipe 46 transversely at the end of pipe 31, and downwardly in gooseneck fashion to a point of attachment on the outside surface of bridge rail 33. The two points of attachment of pipe 41 are adjustable connections since practical installation considerations may at times necessitate removal of the pipe 46 and this pipe is also used to effect a tensioning adjustment of a cable 47, which passes around sheaves 26, 48 and 49, such adjustment being by means of an adjustment screw 50, which interacts between the end of the bridge pipe 31 and the sidewall of the pipe 46, at a point approximately midway between sheaves 48 and 49.

The cable 47 is formed into a closed loop by passing the two ends thereof outwardly through the throat of a pivoted cable connector 51 and securing the ends of the cable with a cable clamp 52, as shown in FIGS. 1, 5 and 6. Preliminary tensioning of the cable 47 is made at this point, during the placing of the cable clamp 52 in position around the two cable ends, and against the back surface of the pivoted cable connector 51. The pivoting stem 53 of the pivoted cable connector 51 is inserted through a tubular bearing 54 at one end of a connecting rod 55. The opposite end of the connecting rod 55 is connected to an auger trolley 56 by employment of pivoting connecting joint 57. Auger trolley wheels 58 engage the upwardly projecting flanges of the bridge rails 33 and 34 so that auger trolley 56 may be readily moved in a longitudinal direction along the bridge rails.

A grain circulating auger 59 is mounted in bearings 60 and 61, which are bolted together with bolt 62 and spacers 63 to form a cage-like structure. A motor mounting frame 64 is defined in part by upper and lower struts 65 and 65a respectively, incorporated into the cage-like structure and extends transversely of the longitudinal axis of the bridge structure. The frame is completed by a plate 66 connected between the struts 65 as shown in detail in FIGS. 5 and 6. Direction of rotation of the auger 59 is indicated by arrow B. The auger 59, motor mounting frame and bearings are supported from the auger trolley 56 by a universal joint 67 attached beneath the auger bearing 60 and to auger trolley support members 68 and 69 as shown in FIGS. 5 and 6. The pivoting axes of the universal joint 67 pass through the axis of the auger shaft 59, so that downward thrust of the auger does not affect tilting thereof in any direction, nor impose bending stresses on the auger shaft 59. The auger 59 may be slanted in any direction with respect to the auger trolley 56 and the bridge rails 33 and 34, within the physical limitations of the surrounding structures, including the limitation purposely imposed by stop screw 70, which bears upon the support member 68 as shown in FIG. 5 to prevent slanting of the auger 59 in the counter-clockwise direction.

Slanting of the auger 59 in the vertical plane parallel to the axes of bridge rails 33 and 34 is controlled by a lever 71 which pivots a fulcrum 72 attached to the inboard end of the auger trolley 56. The lever 71 acts through a connecting rod 73 secured to the lower strut 65a of the motor mounting frame 64 by a connecting lug 74 as shown in FIGS. 5 and 6 to effect a moment arm with respect to the universal joint 67. As the auger trolley 56 rolls to the inboard end of the bridge, the lever 71 contacts a stop screw 75, mounted on the rail 33 causing the auger 59 to be slanted toward the center of the grain drying bin as shown in FIG. 4 by a pull in that direction on the connecting rod 73. Correspondingly as the auger trolley 56 rolls to the outboard end of the bridge, the lever 71 contacts a stop screw 76 also mounted on the rail 33 causing the auger 59 to be slanted outwardly toward the wall of the grain drying bin as shown in FIG. 3. Adjustment of the stop screw 75 and 76 determines the degree of slant of the auger 59 at each position, each adjustment being, of course, independent of the other.

Examination of the auger 59 will reveal that the pitch, i.e., the number of turns of helicoid flights in a given length of shaft, varies progressively from "fine" at the lower end of the auger 59 to "coarse" at the top thereof. This progressive variation serves several purposes. First, the progressive variation in pitch from fine near the bottom end to coarse near the top facilitates starting in compacted grain, this being a serious operational problem, as previously mentioned, even with an auger of small diameter. In attempting to initiate operation of the auger in compacted grain, it will be found that the auger can be rotated to a limited degree, perhaps half of one revolution, but that when so rotated, the auger threads up and down through the compacted grain, much like a screw in a nut. As a result, the auger will pull its supporting means up and down at the same time, damaging or dislocating said supporting means if undue rotational force is brought to bear, causing the supporting means load to exceed the flexibility of its various components. If the pitch of the auger is uniform throughout its entire length, the aforementioned threading action will take place with virtually no disturbance of the grain. However, if the pitch is not uniform throughout the entire length the auger, auger rotation of even a small fraction of a revolution will tend to disturb the grain at some level, the difference in pitch tending to exert a wedging force on the grain. For example, the top level is brought into an interlevel conflict with the bottom level, which would probably result in a loosening of the upper layers of grain around the auger. Even a partial disturbance of the compaction and static friction will reduce the resistance to rotation and make further, progressive disturbance possible, the result being that the auger is eventually freed of the compaction more easily than would have been the case with an auger of uniform pitch, which would have had to be forced loose in the grain throughout its entire length simultaneously.

Secondly, the finer pitch at the bottom end of the auger provides a gentler lifting action of the grain which is subject to the greatest pressure and compaction, and therefore most likely to be damaged by forcible movement. The fine pitch avoids this possibility as much as is possible with a device of this type.

Also, the progressively lengthening distance between flights of the auger effects an expanding action on the grain as it is augered upward, loosening and taking in additional grain at upper levels, thereby producing a desirable degree of interlevel mixing.

An effect substantialy similar to that of the variable-pitch auger just discussed could also be achieved by use of an auger with constant pitch and variable diameter, tapering from small diameter at the bottom to larger diameter at the top, in other words, conical in shape, except that the advantage in overcoming compaction would not be as great. Practical considerations such as manufacturing costs would seem to favor the variable pitch.

Auger shaft 59 is caused to rotate by power supplied by an electric motor 77 through pulleys 78 and 79 and a belt 80, as shown in FIGS. 1, 5 and 6.

The electrical aspects of the grain circulation and mixing machine of this invention are relatively simple, and are shown diagrammatically in FIG. 7, which also gives a detail of the construction of the sliding shut-off plate 19 and its relationship to the switch box 18 and extension spring 20. The two electrical power lead-in wires are designated by reference numbers 81 and 82. Lead-in wire 82 is connected to one terminal of an operating switch 83, which is housed in switch box 18, lead-in wire 81 being connected to a terminal for connection to wire 81a. A wire 82a is connected to the other pole of the switch 83. In practice, wires 81a and 82a run from the switch box 18, through the pipe 17, side-entrance T 15, and downwardly through the suspension pipe 24. Wires 81a and 82a are connected to the terminals in the upper half of rotary slip-ring contactor unit 28. Wires 81b and 82b are connected to the terminals in the lower half of rotary slip-ring contactor unit 28 and extend through the flexible electrical conduit 29 into the junction box 30. A division of the circuit is made in junction box 30. Wires 81c and 82c extend through a conduit pipe 84, and connect to two of the three wires of a helicoid retractile cord 85, the two wires referred to being designated by reference numerals 81d and 82d in FIG. 7. The other ends of the wires 81d and 82d are connected to the power terminals of the electric motor 77, in the motor junction box 86, completing the electrical power circuit to the motor. At one terminal of electric motor 77, the wire 81d is connected to a wire 81e, which runs from the motor junction box 86 to a mercury switch box 87, to be connected to one terminal of a mercury switch 88. A wire 81f is connected to the other terminal of the mercury switch 88 and returns to the motor junction box 86, where it is connected to the third wire 81g of the helicoid retractile cord 85. At the other end, the wire 81g is connected to a wire 81h, which extends back through the conduit pipe 84 to the junction box 30. At the junction box 30, the wire 81h and the junction of wires 82b and 82c are connected to the two wires 81i and 82e, respectively, of a two-wire cord 90. The two-conductor cord 90 extends from the junction box 30, through the gooseneck pipe 31 and pipe 46, and along the inside of bridge rail 33 to a convenient place for connection to the bridge drive motor 39, as shown in FIG. 1. It will be seen that while the auger drive motor 77 will be operative at all times the switch 83 is closed (assuming electrical power is connected to wires 81 and 82), the operation of bridge drive motor 39 is dependent upon the continuity of the electrical circuit 81, which includes the mercury switch 88. It will be noted in FIG. 1, and in more detail in FIGS. 5 and 6, that the mercury switch box 87 is adjustably mounted on motor mounting frame 64 by a pivoted connection 91 and adjustable bolt 92, the inclination of the mercury switch 88 determining the continuity of the electrical circuit 81.

The operation of the grain circulation and mixing apparatus of this invention will now be described assuming that the auger and related components are substantially in the position shown in FIGS. 1, 2 and 5. When the switch 83 is closed, energizing the electrical circuits, the electric motors 39 and 77 will start to operate, assuming that the auger 59 is free to rotate, i.e., not so embedded in compacted grain that it cannot be turned by motor 77. The auger 59 will start to elevate grain as, simultaneously, carriage 37 begins to travel around the bin wall in the direction indicated by arrow A. In other words, the bridge will start to rotate in a counter-clockwise direction as viewed from above, about the vertical centerline of the suspension assembly. The suspension assembly is restrained from rotating by the chain 22, which, as previously explained, is secured to the roof of the grain drying bin. The auger 59, being suspended from the auger trolley 56 mounted on the bridge rails 33 and 34, will start to move through the grain in a path approximating an arc drawn about the vertical centerline of the suspension assembly; this arc will be modified by the fact that cable drive sheave 26 does not rotate with the bridge, and is, therefore, in effect, rotating oppositely, or clockwise relative to the bridge. This relative rotation causes the cable 47 to move, also in a clockwise direction relative to the bridge assembly, around the cable path formed by sheaves 26, 48 and 49, carrying along this same cable circuit, the pivoted cable connector 51. A similar motion to the connecting rod 59, which pushes the auger trolley 56 along the bridge rails 33 and 34, toward the outside of the bin, is also imparted. A pattern of the path of the lower tip of the auger 59 is shown in FIG. 8, the starting point, from the foregoing discussion, being at point X, and the direction of the motion being an outwardly-spiralling one. This path will approximate the geometrical involute of the circle of the bottom or root of the groove of the cable drive sheave 26.

If the grain drying bin is filled approximately as indicated by the dotted lines in FIGS. 2, 3 and 4, and if the grain is of high moisture content, the lateral movement of the lower end of the auger 59 will encounter considerable resistance from the uncirculated grain in the path of auger 59. Since movement of the carriage 37 is at constant speed, the auger 59 will tend to trail back in the manner indicated in FIG. 6, the universal joint 67 allowing this trailing back, or tilting, of the auger 59. When the degree of backward angularity shown in FIG. 6 is reached, the mercury in the mercury switch 88 rolls to the opposite end of the mercury switch and breaks the circuit 81 which supplies electrical energy to the bridge drive motor 39, so that the carriage 37 will stop moving along track 6, but the auger 59 will continue to rotate. The backwardly-tilted weight of the auger 59, slightly augmented by the off-center weight of the auger drive motor 77 and adjoining parts, will gently but steadily press the rotating auger 59 into the grain immediately ahead of auger 59. Thus, it will be seen that the auger is caused, largely by the force of its own weight, to work its way through the grain mass. The backward angularity of the auger and attendant parts at which the mercury switch 88 breaks the electrical circuit to the bridge drive motor 39 is determined by the angle at which the mercury switch box 87 is set, this being regulated by adjustment of the adjustable bolt 92. The differential angle of the mercury switch 88 will be the angle through which auger 59 will work through the grain before the electrical circuit 81 is again completed to cause the drive motor 39 to commence propelling the carriage 37 along track 6 and the bridge to resume its rotary motion.

It will be seen from the foregoing description of the action of the mercury switch 88 together with the tilting of the auger 59 that an inherently self-regulating system is provided, the difficulty with which the auger 59 works its way through the grain determining the duration and frequency of stoppages of the motion of the carriage and bridge. The foregoing is one of the salient points of this invention, in that by use of the self-regulating system described, the auger is propelled through the grain as rapidly as said auger can work its own way through said grain, but is not so forcibly thrust into the grain mass as to impose undue stresses upon the auger shaft and bearings, a frequent cause of shaft failure in devices of this type. It will also be apparent that regulatory means other than mercury switch 88 may be employed, such as pendulum switches, mechanical clutches, etc. Practical experience has indicated that the mercury switch design depicted herewith is one of the simplest and most reliable, considering the various service conditions which must be contended with such as contaminants like dust, frost, moisture and grain particles.

As the lower extremity of the auger 59 progresses in a counter-clockwise direction along the line shown in FIG. 8, it will be seen that one circuit of the grain drying bin will bring the auger 59 to a point only about one-half as distant from the outside wall of the grain drying bin as when the auger 59 was at point X. At approximately this stage of the operational cycle, the lever 71, being carried along the bridge by the auger trolley 56, will contact the stop screw 76. Accordingly, further outward motion of the trolley 56 will actuate the lever 71 and induce an outward slant of the auger 59, the ultimate position being shown in FIG. 3. When the auger 59 attains the attitude shown in FIG. 3, the pivoted cable connector 51 will have travelled to the sheave 48, and with the pivot of the pivoted cable connector making a turn of approximately 90°, will have arrived at the point on the periphery of the sheave 48 farthest from the center of the grain drying bin. As the carriage 37 continues to move along the track 6, with or without the frequent interruptions occasioned by tilting of the auger 59, the pivoted cable connector 51 will approach the sheave 49. When the pivoted cable connector 51 was at the sheave 48, the lower extremity of the auger was in the position indicated by the arrowhead in FIG. 9. When the pivoted cable connector 51 arrives at the sheave 49, the lower extremity of the auger 59 will have made a nearly complete circuit of the area just inside the bin wall. As the pivoted cable connector 51 starts around sheave 49, making another, further turn of approximately 90°, the lower extremity of the auger 59 will then have travelled to the position shown by the arrowhead in FIG. 9, and be about to start spiralling inward. The auger 59 will, during the aforementioned circuiting of the inside of the bin wall, have been held outwardly toward the bin wall in the attitude shown in FIG. 3 by action of the lever 71 and the connecting rod 73.

Figure 10:
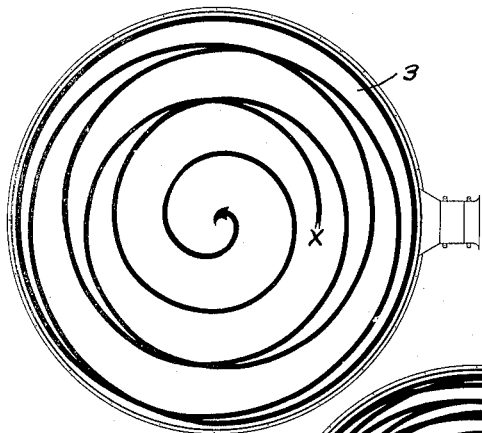

As the pivoted cable connector 51 starts to move along the opposite flight of the cable path from that on which it is shown in FIGS. 1 and 5, connecting rod 55 will then begin to pull the auger trolley 56 toward the center of the bin. Also, as the auger trolley 56 moves away from its extreme outboard position, the lever 71 will no longer be pressed against stop screw 76, and will no longer induce the outward slanting attitude of auger 59. Accordingly, the auger will return to the normal, substantially vertical position shown in FIG. 2. The path of travel of the lower extremity of the auger 59 will now assume the pattern of an inwardly-spiralling involute and will so continue until the lower extremity of the auger approaches the center of the grain drying bin, at which time also the pivoted cable connector 51 approaches the cable drive sheave 26. As the pivoted cable connector approaches cable drive sheave 26, the lever 71 will contact stop screw 75 and be actuated in a direction oppositely from the direction of actuation which occurred when the lever contacted the stop screw 76. The lever will therefore induce an inward, rather than outward, slanting of auger 59, causing it to assume the attitude depicted in FIG. 4 when the pivoted cable connector 51 reaches the point on the periphery of the cable drive sheave 26 farthest from sheaves 48 and 49. The pivoted cable connector will be at this time, making a further turn of approximately 180°, or, in total, a full 360° of rotation during the period of operation so far described. At the time when the pivoted cable connector 51 is at the point on the periphery of cable drive sheave 26 farthest from sheaves 48 and 49, the lower extremity of the auger 59 will have reached the center of the grain drying bin, as indicated by the arrowhead in FIG. 10. The path of the lower extremity of the auger 59 at this point is shown as having travelled from a point X, midway between the center of the grain drying bin and the outer wall of said grain drying bin, to the outer wall, and all the way back to the center of said grain drying bin.

Figure 11:
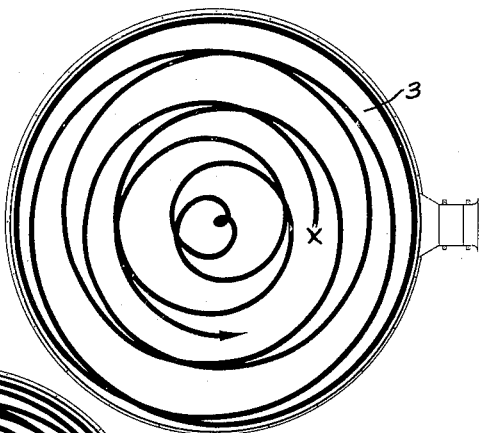

As the pivoted cable connector 51 makes the aforementioned turn of approximately 180° around cable drive sheave 26, the connecting rod 55 swings from the position depicted in FIG. 6 to that of FIGS. 1 and 5, and again begins pushing the auger trolley 56 outwardly toward the wall of the grain drying bin. As auger trolley 56 moves outwardly, the lever 71 will no longer be pressed against stop screw 75, and the auger will again, gradually and of its own weight, resume the substantially vertical attitude shown in FIG. 2. The path of the lower extremity of the auger 59 during this outward travel is again in the form of an outwardly-spiralling involute, as shown in FIG. 11, the arrowhead being, in FIG. 11, approximately as far from the center of the grain drying bin as the point of beginning X. One complete cycle of the grain circulation and mixing machine has now been described, and is shown diagrammatically in FIG. 11.

Figure 9:
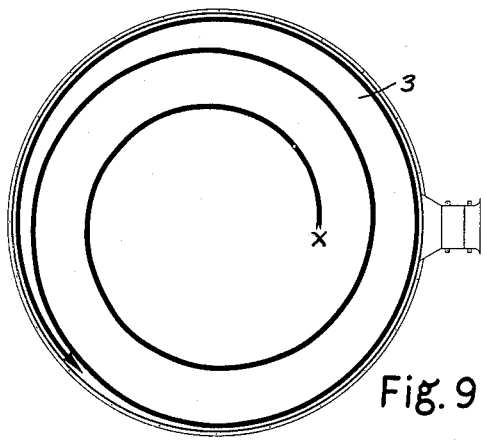
Figure 12:
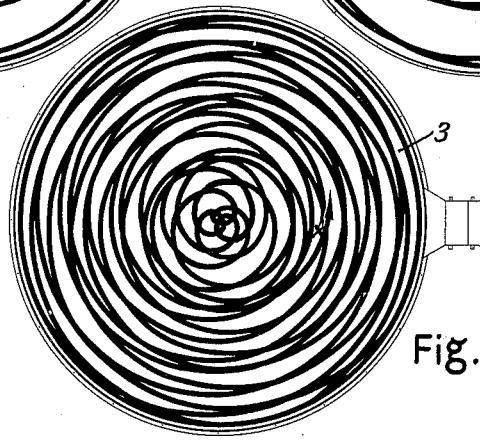

Continued operation of the grain circulation and mixing machine will produce additional cycles which will be superimposed upon the first cycle, but the cable drive, being inherently lacking in any precise mathematical relationship of rotation to reciprocation as would be the case with gear or chain-and-sprocket actuation, the successively-superimposed cycles will never exactly coincide, and the auger 59 will continue to divide the rather large voids to be seen in FIG. 11 into ever-smaller areas. FIG. 12 is an illustration of this action, being the same as FIG. 11, with two complete additional cycles of auger travel superimposed. It should be noted that the arrowhead, indicating the location of the lower extremity of the auger 59 after the aforementioned three cycles, is close to the starting point, X, but not precisely over point X, and if the travel diagram were to be continued into a fourth cycle, the line would lie close to, but never become identical with, the initial line of travel as shown in FIGS. 8, 9, etc. Continuation of the diagram of FIG. 12 for a few more cycles would eventually result in a solid black circle; or, in practice result in substantially all of the grain being moved, circulated and/or mixed.

It will be appreciated therefore, that the present invention provides an extremely effective apparatus for circulating grain in a drying bin while the drying process is being carried out and by which apparatus the above-mentioned objects are completely fulfilled. It is to be distinctly understood however, that the foregoing description is illustrative of preferred embodiments only, not limiting, and that the true spirit and scope of this invention is to be determined by the appended claims.

What is claimed is:

1. Apparatus for stirring and circulating grain stored in a bin, said apparatus comprising: an auger adapted to extend downwardly into the grain; movable support means for carrying said auger in a generally spiral path about the bin, means to connect the upper end of said auger to said support means for pivotal movement with respect to said support means, drive means for moving said support means to carry said auger in said path; and means for disabling said drive means when said auger exceeds a predetermined angle of inclination in said path.

2. The apparatus recited in claim 1 in which said support means comprises a bridge to extend radially of the bin, means to support the outboard end of said bridge including a circular track adapted to be mounted at the outer periphery of said bin, and a carriage movable on said track, flexible suspension means for supporting the inboard end of said bridge at the center of the bin, and a trolley movable along said bridge.

3. The apparatus recited in claim 2 in which said flexible suspension means includes at least one chain adapted to be secured at its upper end to the bin roof, a suspension element carried at the lower end of said chain, the inboard end of said bridge being rotatably connected to said suspension element, and means for holding said suspension element against rotation.

4. The apparatus recited in claim 3 in which said drive means for moving said support means includes a motor on said carriage for propelling said carriage and the outboard end of said bridge around said track, a stationary sheave supported by said suspension element; a pair of rotatable sheaves supported on said bridge, an endless flexible drive means trained about said sheaves and a pitman extending between said trolley and a fixed point on said flexible drive means to move trolley and said auger along said bridge concurrently with movement of said bridge about the bin, said pair of rotatable sheaves being spaced from the inboard end of said bridge to define a flight portion in said flexible drive means extending in the direction of said path whereby said trolley is maintained in its outwardmost position on said bridge while the point of connection of said pitman to said flexible drive means is on said flight portion.

5. Apparatus for stirring and circulating grain in a drying bin, said apparatus comprising: an auger adapted to extend downwardly into the grain; movable support means for carrying said auger along a generally spiral path; pivotal means connecting the upper end of said auger to said support means to enable said auger to swing freely in the direction of said path; a motor for moving said support means to carry said auger in said path; and power supply means for said motor; said power supply means including means carried by said pivotal means to de-energize said motor when said auger exceeds a predetermined angle of inclination in said path.

6. The apparatus recited in claim 5 in which said auger is provided with screw flights of varying pitch, the pitch ranging from fine at the lower end of said auger to coarse at the upper end thereof.

7. The apparatus recited in claim 5 in which said movable support means includes a bridge adapted to be supported radially of the bin, the outboard end of said bridge being movable about the outer periphery of the bin while the inboard end thereof is retained at the center of the bin, a trolley movably carried on said bridge and in which said pivotal means includes a bearing cage for rotatably supporting said auger and a universal joint supporting said bearing cage from said trolley.

8. The apparatus recited in claim 5 including another electric motor for rotating said auger, a frame for mounting said other motor, said frame being cantilevered from said bearing cage in a rearward direction with respect to the direction of auger travel along said path.

References Cited by the Examiner

UNITED STATES PATENTS

| | | | |
|---|---|---|---|
| 1,866,227 | 7/1932 | Shaughnessy | 259—102 |
| 1,999,564 | 4/1935 | Hartung | 259—102 |
| 3,114,622 | 12/1963 | Hardy | 34—181 |
| 3,156,541 | 11/1964 | Kalke | 34—181 |

WILLIAM I. PRICE, *Primary Examiner.*